(12) United States Patent
Zuniga et al.

(10) Patent No.: US 8,290,507 B2
(45) Date of Patent: Oct. 16, 2012

(54) LOCATING A WIRELESS DEVICE

(75) Inventors: Fabiel Zuniga, Roseville, CA (US);
Rick Porter, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 12/425,055

(22) Filed: Apr. 16, 2009

(65) Prior Publication Data
US 2010/0265091 A1 Oct. 21, 2010

(51) Int. Cl.
*H04W 24/00* (2009.01)
(52) U.S. Cl. .................. 455/456.1; 455/456.6
(58) Field of Classification Search .............. None
See application file for complete search history.

(56) References Cited

U.S. PATENT DOCUMENTS

| | | | |
|---|---|---|---|
| 7,236,128 B2 | 6/2007 | Sugar | |
| 2006/0087425 A1* | 4/2006 | Haeberlen et al. | 340/539.13 |
| 2007/0087763 A1* | 4/2007 | Budampati et al. | 455/456.5 |
| 2008/0070572 A1* | 3/2008 | Shkedi | 455/435.1 |
| 2009/0082034 A1* | 3/2009 | Gray et al. | 455/456.1 |

* cited by examiner

*Primary Examiner* — Erika Gary

(57) ABSTRACT

A computer-implemented method for determining the location of a wireless device includes dividing an area into a grid and assigning the wireless device to a first portion of the grid. The method continues with calculating a first difference between a signal strength expected when the wireless device is at the first portion of the grid and a measured signal strength and assigning the wireless device to a second portion of the grid. The method also includes calculating a second difference between a signal strength expected when the wireless device at a second portion of the grid and a second measured signal strength and concludes with selecting the least one of the first and second differences to determine the location of the wireless device.

19 Claims, 3 Drawing Sheets

LOCATING A WIRELESS DEVICE

BACKGROUND

In many modern office environments, the use of wireless devices enables employees to move freely within the confines of the office while performing their job functions. This can allow the employees to be more productive and able to respond more quickly to urgent business matters regardless of the employees' physical locations within the office. Further, many individuals find it highly desirable to be at liberty to perform their job functions whether they are located within a designated workspace, a conference room, or a common area shared by other employees.

Unfortunately, serving an office space with wireless connectivity can increase the possibility of fraudulent use of the office computing infrastructure. Non-employees located outside of the designated office environment may be able to surreptitiously access the computing infrastructure and negatively impact business functions. These negative impacts may include the theft of trade secrets, the compromising of confidential customer information, and so forth.

DESCRIPTION OF THE EMBODIMENTS

In accordance with various embodiments of the invention, locating a wireless device enables information technology administrators in office, academic, and other environments to determine if wireless device users are located within the confines of the areas served by the information technology infrastructure. Among other things, the embodiments of the invention described herein enable wireless devices to be quickly located without requiring any knowledge as to the transmit power of the particular wireless device. Additionally, the method need be performed only once to provide an estimation as to the location of the wireless computing device.

By rapidly determining the location of particular wireless users, unauthorized users, such as those outside of the designated office space, can be detected based on their location and precluded from accessing the information technology infrastructure. As a further benefit, in the event that the wireless device is a WiFi-enabled cellular telephone operating within the office environment, any emergency (911) call made by user of the cellular telephone can be immediately traced to a precise location within the served area.

Figure 1:
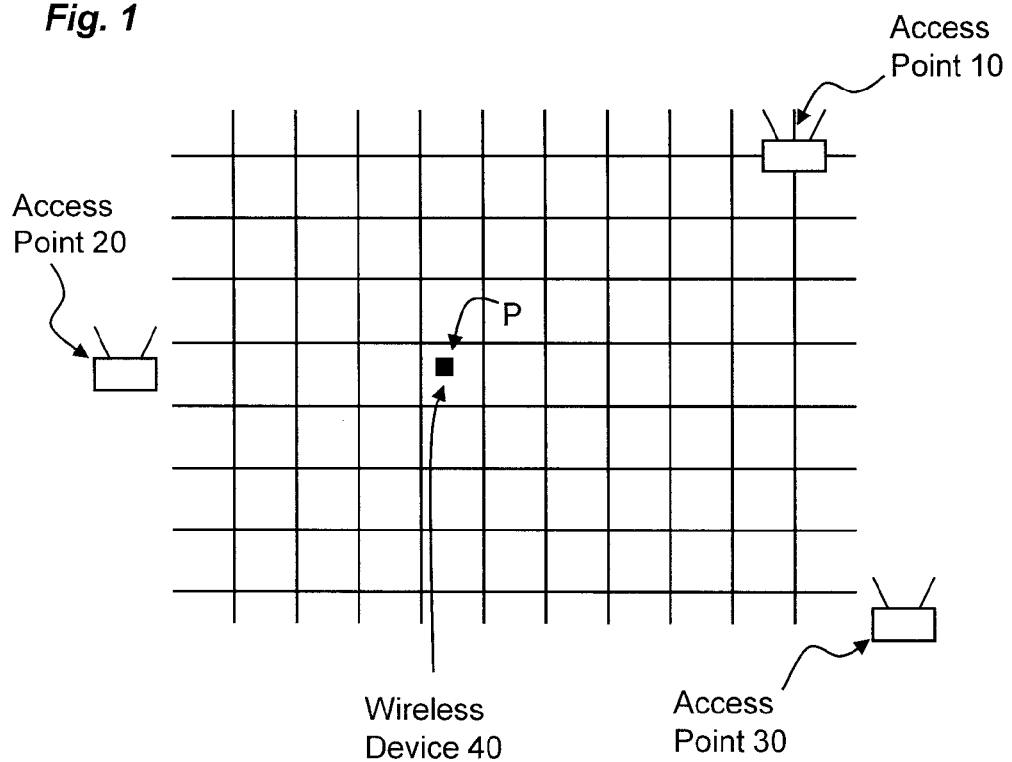
FIG. 1 shows a diagram of a wireless device operating in an area served by several access points according to an embodiment of the invention.

FIG. 1 shows a diagram of a wireless device operating in an area served by several access points according to an embodiment of the invention. In FIG. 1, access points 10, 20, and 30 receive signals from and transmit signals to wireless device 40. Wireless device 40 represents any one of several types of devices that includes a wireless transmit capability. Such devices include laptop or notebook computers, desktop computers with wireless capability, handheld computing devices such as personal digital assistants, and WiFi-enabled cellular telephones. In the embodiment of FIG. 1, access points 10, 20, and 30 are capable of measuring the signal strength of wireless device 40 when the wireless device is transmitting.

In accordance with conventional algorithms, the expected signal strength present at each of wireless access points 10, 20, and 30 can be expressed as:

$$Er(P) = Ar(P) + t \quad (1)$$

In which "Er(P)" represents the expected signal strength, "Ar(P)" represents the attenuation of the signal as the signal travels from wireless device 40 to the access point, and "t" equals the transmit power. All variables in the above equation are expressed in logarithmic values, such as dBm (decibels referenced to 1 milliwatt).

In the event that wireless device 40 has been correctly estimated to be at location P, it follows that the expected signal strength, Er(P), and the measured signal strength, Sr, at each of access points 10, 20, and 30 will be approximately equal. Thus:

$$|Er_{10}(P) - Sr_{10}| \approx |Er_{20}(P) - Sr_{20}| \approx |Er_{30}(P) - Sr_{30}| \approx 0 \quad (2)$$

The implication of the above formula is that the expected signal strength at access point 10 minus the power measured at access point 10 is (approximately) equal to zero. Additionally, the expected power at access point to 20 minus the power measured at access point 20 is also approximately equal to zero as is expected power at access point 30 minus the power measured at access point 30. Further, substituting equation (1) into equation (2) provides the following result:

$$|Ar_{10}(P) + t - Sr_{10}| \approx |Ar_{20}(P) + t - Sr_{20}| \approx |Ar_{30}(P) + t - Sr_{30}| \approx 0$$

Since "t" is a constant, this expression can be rewritten as:

$$|Ar_{10}(P) - Sr_{10}| \approx |Ar_{20}(P) - Sr_{20}| \approx |Ar_{30}(P) - Sr_{30}| \approx t$$

From the above expression, it can be seen that if each value of attenuation minus the measured signal strength at each of access points 10, 20, and 30 can be minimized, it is most likely that wireless device 40 is indeed at point P. Expressed in the form of an equation:

$$e_p = (1/3) \sum_{r=1}^{3} (|Ar(P) - Sr| - \mu)^2 = \text{variance}$$

And $$\mu = (1/3) \sum_{r=1}^{3} |Ar(P) - Sr| = \text{mean}$$

Which, for r=1, the attenuation between wireless device 40 and the measured signal strength at access point 10 is used. For r=2, the attenuation between wireless device 40 and the measured signal strength at access point 20 is used. For r=3, the attenuation between wireless device at 40 and the measured signal strength at access point 30 is used.

In one embodiment of the invention, for each zone in the grid shown in FIG. 1, an expected attenuation between the particular grid zone and access points 10, 20, and 30 is stored within a management server coupled to each access point. When attempting to locate the point P at which wireless device 40 is located, point P is sequentially assigned to each zone in the grid. For each zone, the mean and variance from expected versus measured values for signal strength are calculated. When the mean and variance of values for all of the zones within the grid of FIG. 1 are calculated, a logic module within the management server selects the zone within the grid corresponding to the minimum value for $e_p$. This may be expressed mathematically as:

Let $e_U = \{e_P | P \in U\}$

Let $\omega = \text{Min}\{e_U\}$

If P' is the point at which the wireless device ($\omega$) is located (L), then P' $\in$ L $\{P | P \in U \wedge |e_P - \omega| \leq \tau\}$ (In which $\tau$ is an error threshold.)

In accordance with the above process, the grid zones for which the quantity $|e_P - \omega| \leq \tau$ have the highest probability of corresponding to the location of wireless device 40. Depending on the error in the measurement of the signal strength, it is conceivable that the process could return more than one candidate grid zone.

Although the example of FIG. 1 includes only access points 10, 20, and 30, nothing prevents the use of more access points at which the signal strength from wireless device 40 may be measured. Further, it can be appreciated that assumptions as to the transmit power of wireless device 40 need not be included. The method of the embodiments herein provides a more elegant technique of locating the wireless device.

In accordance with the example of FIG. 1, it is contemplated that a processor within a management server divides the area into a series of grid zones. It is additionally contemplated that the grid zones are either square or rectangular; however, nothing prevents the use of grid zones that are shaped according to any desired polygon. Further, although each grid zone of FIG. 1 is shown as encompassing an equal area, nothing prevents some grid zones from being larger than others.

In accordance with one embodiment of the invention, the expected relative power of the wireless device is determined by way of theoretical calculations. In these calculations, the effects of free space attenuation, diffraction around conducting surfaces, transmit and receive antenna gains, multipath propagation, as well as frequency-dependent loss factors are included in a computer model of the service area.

In another embodiment of the invention, prior to performing any calculations to determine the location of a wireless device, the expected relative power of a wireless device as received by the various access points is first determined. In this embodiment, a wireless device is first placed within a first grid zone and a first relative power at each of the wireless access points (such as wireless access points 20, 30, and 40 of FIG. 1) is measured. After this measurement is recorded, the wireless device is placed at a second grid zone and another relative power measurement received at each of the wireless access points is measured. This process continues until the wireless device has been placed at each portion of the grid and relative power measurements at each wireless access point serving the service area have been made. As previously mentioned, although three wireless access points (20, 30, and 40) are shown in the example of FIG. 1, nothing prevents the use of an additional number access points, such as four or five or more.

Figure 2:
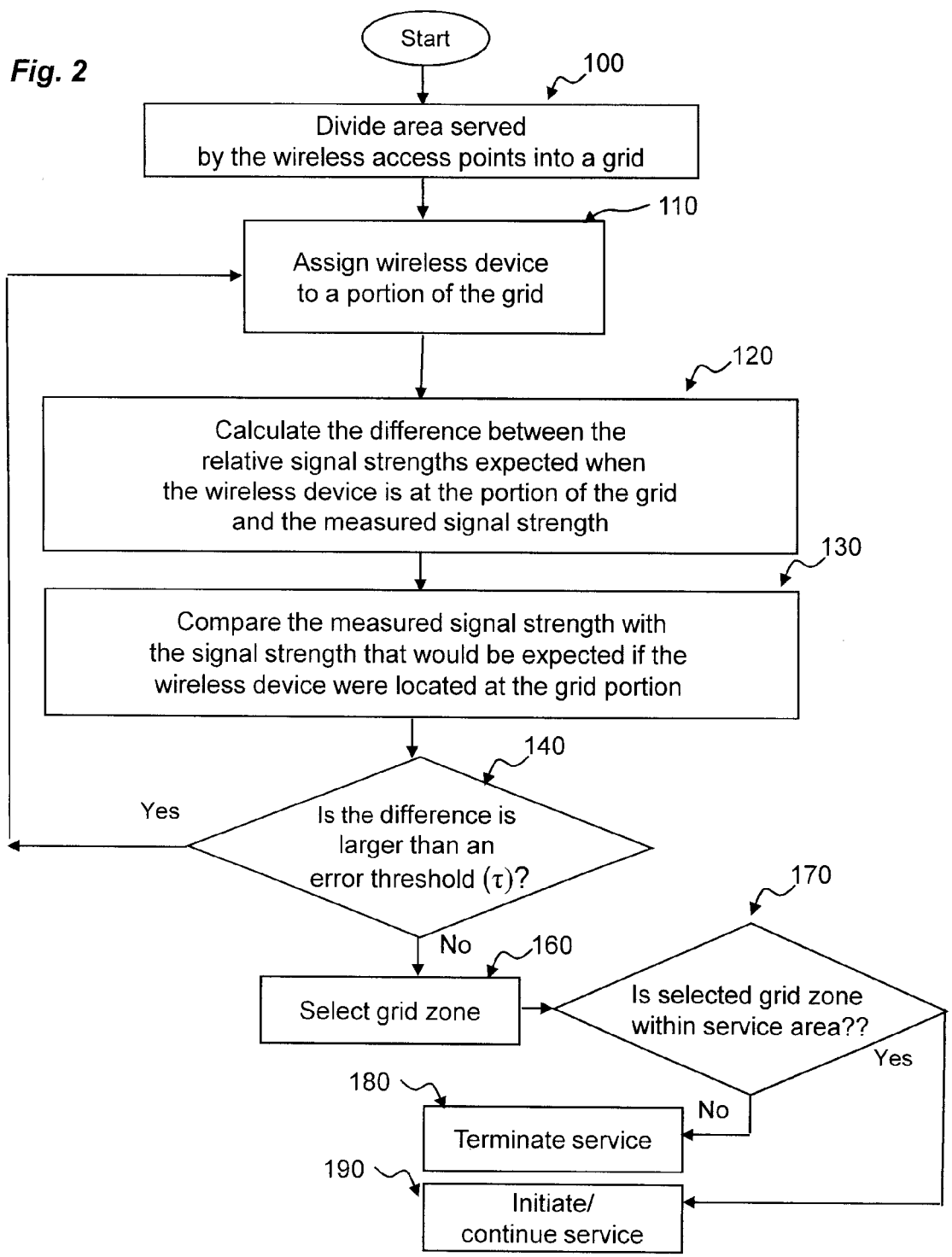
FIG. 2 is a flowchart for a computer-implemented method for locating a wireless device according to an embodiment of the invention.

FIG. 2 is a flowchart for a computer-implemented method for locating a wireless device according to an embodiment of the invention. After receiving a signal, step 100 is performed in which the area served by the wireless access points is divided into a grid. At step 110, the transmitting wireless device is assigned to a first portion of the grid. At step 120, a first difference between the relative signal strengths expected when the wireless device is at the first portion of the grid and the measured signal strength is calculated. At step 130, a comparison is made in which the measured signal strength is compared with the signal strength that would be expected if the wireless device were located at the first grid portion. At step 140, a decision is made in which the result of the comparison of step 130 is compared with an error threshold ($\tau$).

In the event that the decision of step 140 indicates that the first difference is larger than an error threshold, the method returns to step 110 in which the wireless device is assigned to a next portion of the grid. The method continues at step 120 in which the difference between the relative signal strengths expected when the wireless device is at the portion of the grid and the measured signal strength is calculated. The method then continues at step 130, which performs a comparison as described hereinabove. In the event that the decision step (140) indicates that the second difference is larger than an error threshold, step 110 is again executed in which the wireless device is assigned to a third portion of the grid.

The process of assigning the wireless device to a particular portion of the grid, comparing the measured signal with an expected signal strength, and so forth, continues until the relative difference between the measured and expected signal strength at each of the wireless access points is less than a threshold value. In the event that the relative difference between the measured and the expected signal strength at each of the wireless access points is less than the threshold, step 160 is performed in which the grid zone is selected.

When the grid zone has been selected, as in step 160, the method proceeds to step 170. In step 170, a determination is made as to whether the located wireless device is within the area served by the wireless access points, such as wireless access points 20, 30, and 40 of FIG. 1. In the event that the wireless device appears to be located outside of the service area, step 180 may be performed in which service to the wireless device is terminated. In the event that the selected grid zone is within the service area, step 190 can be executed in which service to the wireless device is either initiated or continued.

In another embodiment of the invention, all of steps 110-140 are repeated until all of the grid zones have been evaluated. At step 160, a group of grid zones (all having an error threshold less than $\tau$) may be selected. The method may then include an additional step in which a message containing a list of grid zones likely to correspond to the location of the wireless device is conveyed to a system administrator. Depending on the precision of the computer model of the service area, or other factors, the administrator may decide whether or not to terminate service (step 180) or initiate/continue service to the located wireless device.

Figure 3:
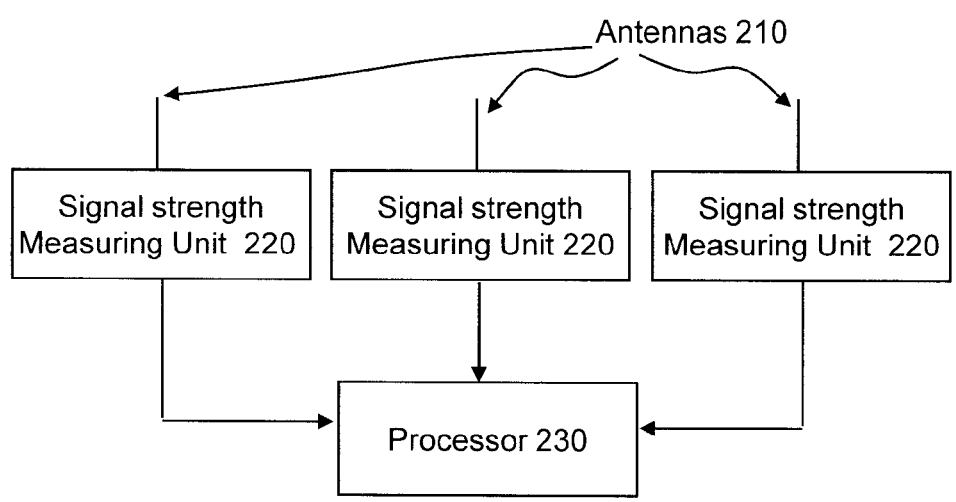
FIG. 3 is a block diagram of a system for locating a wireless device within an area according to an embodiment of the invention.

FIG. 3 is a block diagram of a system for locating a wireless device within an area according to an embodiment of the invention. In FIG. 3, antennas 210 receive and transmit RF signals to and from a wireless device. Coupled to each of antennas 210 is one of signal strength measuring units 220. An output of each signal strength measuring unit 220 is coupled to processor 230. Processor 230, in turn, compares the outputs of signal strength measuring units 220 and selects the particular grid zone (or zones), which, if a wireless device were transmitting within the particular grid zone, would be most likely to produce the measured relative signal strengths at antennas 210.

Figure 4:
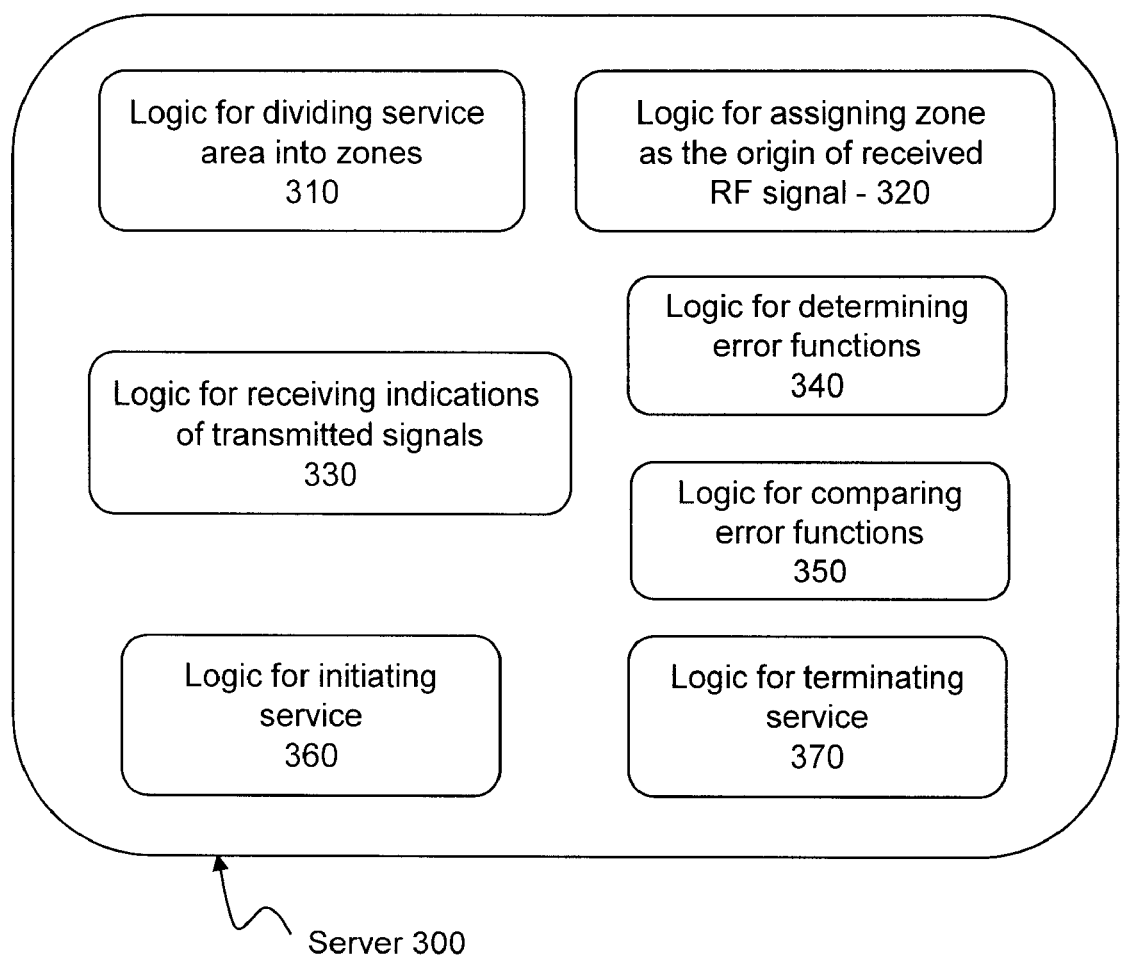
FIG. 4 shows a set of logic modules within a management server for locating the origin of a received radio frequency signal according to an embodiment of the invention.

FIG. 4 shows a set of logic modules within a management server for locating the origin of a received radio frequency signal according to an embodiment of the invention. The logic module of FIG. 3 includes logic 314 for dividing a service area into a plurality of zones. The logic module additionally includes logic 320 for assigning one of the plurality of zones as being the origin of a received radio frequency signal. Further included is logic 330, which is capable of receiving indications that signals have been received from a plurality of wireless access points within the service area.

Logic 340 is capable of determining error functions, such as a first error function, that represents a difference between an expected signal and a measured signal strength. When logic 340 has calculated at least two error functions, logic 340 may couple to logic 350 in which the error functions are compared and a smaller of the two or more error functions is selected as representing the zone in which a wireless device is most likely to be located. Logic 360 functions to initiate service to a wireless device in the event that the device is located within the service area. Logic 370 functions to terminate service to a wireless device should the device be located outside of the service area.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A computer-implemented method for determining the location of a wireless device, comprising:
    dividing an area into a grid;
    assigning the wireless device to a first portion of the grid;
    calculating a first difference between a signal strength expected when the wireless device is at the first portion of the grid and a measured signal strength;
    assigning the wireless device to a second portion of the grid;
    calculating a second difference between a signal strength expected when the wireless device is at the second portion of the grid and the measured signal strength;
    continuing to assign the wireless device to different portions of the grid until a difference between a signal strength expected when the wireless device is at an assigned portion of the grid and a measured signal strength is less than a threshold value; and
    selecting the assigned portion of the grid as the location of the wireless device.

2. The method of claim 1, wherein the steps of calculating the first difference is performed for at least three wireless access points within or adjacent to the area.

3. The method of claim 2, wherein the steps of calculating the second difference is performed for at least three wireless access points within or adjacent to the area.

4. The method of claim 3, wherein the steps of calculating the first difference and the second difference are preceded by calculating a mean difference between the expected and measured signal strength from the at least three wireless access points within or adjacent to the area.

5. The method of claim 4, wherein the step of calculating a mean difference between the expected and measured signal strength from the at least three wireless access points is followed by the step of calculating the variance between the expected and measured signal strength from the at least three wireless access points within or adjacent to the area.

6. The method of claim 1, wherein the selecting step additionally comprises comparing the least one of the first and second differences with a threshold value.

7. The method of claim it 1, further comprising terminating service to the wireless device.

8. The method of claim 7, wherein terminating service to the wireless device is performed when the location is outside of the area serviced by a management server.

9. A system for locating a wireless device within an area, comprising:
    at least one signal strength measurement unit to measure the strength of a received signal transmitted from the wireless device; and
    a processor to divide the area into a plurality of grid zones and to determine a first error function brought about when the wireless device is within a first of the plurality of grid zones and to determine a second error function brought about when the wireless device is within a second of the plurality of grid zones;
    wherein said processor to transmit a list of grid zones that are possible locations of said wireless device based on said error functions to a system administrator and to receive from said system administrator a determination of whether to allow or terminate service to that wireless device.

10. The system of claim 9, wherein at least three signal strength measurement units measure the strength of the received signal from at least three separate locations.

11. The system of claim 10, wherein the processor determines the first and second error functions by summing the absolute value of the error functions from the at least three separate locations.

12. The system of claim 11, wherein the error function is calculated by the processor comparing expected signal strength with measured signal strength at each of the at least three locations.

13. The system of claim 12, wherein the processor additionally terminates service to the wireless device when the processor determines that the wireless device is outside of the plurality of grid zones.

14. The system of claim 12, wherein the processor additionally initiates service to the wireless device when the processor determines that the wireless device is within one of the plurality of grid zones.

15. A logic module for estimating a location of a wireless device within an area comprising:
    logic to divide the area into a plurality of zones;
    logic to repeatedly assign one of the plurality of zones as a possible location of the wireless device;
    logic to calculate, for each zone assigned as the possible location of the wireless device, an error function, the error function representing a difference between an expected signal strength and a measured signal strength, wherein the expected signal strength is the signal strength that would be measured if the wireless device were located at the corresponding grid zone radio frequency signal originated from the one of the plurality of zone; and logic to, in response to a wireless device in said area making a phone call to emergency services, determine a location of that wireless device for emergency purposes based on said error function calculations.

16. The logic module of claim 15, further comprising logic to terminate service to a wireless device located outside of the plurality of zones.

17. The logic module of claim 16, further comprising logic to initiate service to the wireless device when the wireless device is located within the plurality of zones.

18. The logic module of claim 15, wherein the phone call to emergency services is a 911 phone call.

19. The logic module of claim 15, further comprising logic to identify a zone within the plurality of zones as the location of the wireless device by comparing first and second error functions.

* * * * *

UNITED STATES PATENT AND TRADEMARK OFFICE
CERTIFICATE OF CORRECTION

PATENT NO. : 8,290,507 B2
APPLICATION NO. : 12/425055
DATED : October 16, 2012
INVENTOR(S) : Fabiel Zuniga et al.

Page 1 of 1

It is certified that error appears in the above-identified patent and that said Letters Patent is hereby corrected as shown below:

In the Claims:

In column 6, line 11, in Claim 7, after "claim" delete "it".

In column 7, lines 3-4, in Claim 15, after "zone" delete "radio frequency signal originated from the one of the plurality of zone".

Signed and Sealed this
Twenty-fourth Day of September, 2013

Teresa Stanek Rea
*Deputy Director of the United States Patent and Trademark Office*